United States Patent [19]

Meehan et al.

[11] Patent Number: 5,706,002
[45] Date of Patent: Jan. 6, 1998

[54] METHOD AND APPARATUS FOR EVALUATING THE SYNTAX ELEMENTS FOR DCT COEFFICIENTS OF A VIDEO DECODER

[75] Inventors: Paul Harquail Meehan, Plainsboro; Paul Joseph Panaro, Helmetta, both of N.J.

[73] Assignee: David Sarnoff Research Center, Inc., Princeton, N.J.

[21] Appl. No.: 604,631

[22] Filed: Feb. 21, 1996

[51] Int. Cl.$^6$ .................... H03M 13/00; H04N 7/64
[52] U.S. Cl. ............................ 341/67; 348/405
[58] Field of Search .................... 341/67, 65, 60; 348/403, 405

[56] References Cited

U.S. PATENT DOCUMENTS

| | | | |
|---|---|---|---|
| 5,278,646 | 1/1994 | Civanlar et al. | 358/133 |
| 5,566,089 | 10/1996 | Hoogenboom | 364/514 A |
| 5,570,203 | 10/1996 | Suzuki et al. | 358/432 |
| 5,576,765 | 11/1996 | Cheney et al. | 348/407 |

*Primary Examiner*—Jeffrey A. Gaffin
*Assistant Examiner*—Peguy JeanPierre
*Attorney, Agent, or Firm*—William J. Burke

[57] ABSTRACT

A method and apparatus for creating and using a test bitstream to evaluate a video decoder. The test bitstream contains a plurality of variable length code and/or escape sequences (combination of escape code, run length code and/or level code) for testing the video decoder's ability to decode syntax elements for discrete cosine transform (DCT) coefficients. The method of fabricating the test bitstream requires the selection of the proper DCT coefficients, run and quantizer product to produce a valid test bitstream for exercising all possible test levels without causing an overflow condition. The method selects a test level and a desired DCT coefficient and then computes for an appropriate quantizer product. In turn, the quantizer product is used to compute a quantizer scale and a run. This method is repeated for all desired test levels and the resulting level/run pairs and quantizer scales are encoded into the test bitstream.

20 Claims, 3 Drawing Sheets

METHOD AND APPARATUS FOR EVALUATING THE SYNTAX ELEMENTS FOR DCT COEFFICIENTS OF A VIDEO DECODER

The present invention relates to an apparatus and concomitant method for evaluating the decoding of video signals. More particularly, this invention relates to a method and apparatus for producing a bitstream to exercise the decoding of syntax elements for discrete cosine transform coefficients by a "black box" block-based video decoder in a "non-invasive" manner.

BACKGROUND OF THE INVENTION

The increasing development of digital video technology presents an ever increasing problem of resolving the interoperability of equipment of different manufacturers. To achieve these goals, the Moving Picture Experts Group (MPEG) created the ISO/IEC International Standards 11172 (1994) (generally referred to as MPEG-1) and 13818 (Jan. 20, 1995 draft) (generally referred to as MPEG-2), which are incorporated herein in their entirety by reference.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific algorithm needed to produce a valid bitstream. This flexibility fosters development and implementation of different MPEG-specific algorithms, thereby resulting in product differentiation in the marketplace.

Digital television decoders (such as MPEG decoders) present a difficult testing problem when compared to analog television systems. An analog system has minimal or no memory and is generally linear, such that the system's behavior is instantaneous. Thus, the behavior of an analog system can be extrapolated from one signal range to another.

In contrast, digital decoders are highly non-linear and often contain memory. A digital decoder may operate normally over a particular range of a certain parameter, but may fall dramatically for certain other parameter values. In essence, the behavior of a digital decoder cannot be extrapolated from one signal range to another. Furthermore, a digital decoder may depend on previous data for proper behavior.

Generally, the testing of complex digital systems such as decoders is performed by stimulating the decoder under test with a known sequence of data, and then analyzing the output data sequences or the intermediate data sequences using, e.g., a logic analyzer, to determine if the results conform to expectations. Although this is an effective testing technique, it requires extensive knowledge of the circuit implementation or observation of internal nodes of the particular decoder.

However, in many instances the decoder is a "black-box" that accepts a bitstream (encoded signal) as input and provides a digital or analog representation of the decoded signal as an output. Due to product differentiation in the marketplace, it may not be possible to acquire such technical information for all decoders. In fact, even if such technical information is available, it may not be cost effective to construct a different test sequence for every decoder.

Specifically, block-based encoders (also referred to as MPEG-like encoders) employ the process of discrete cosine transform (DCT), variable length coding and run-length coding to improve coding efficiency in the encoding process. In turn, all MPEG-like decoders must support the important function of inverse discrete cosine transform (IDCT), which is a process of reconstructing the predicted residual or the input samples from the DCT coefficients.

Since MPEG does not define a specific IDCT implementation, the testing of a video decoder's IDCT implementation is complicated by different IDCT algorithms that provide slightly different results due to round-off and truncation in the calculations. Furthermore, since the DCT coefficients are quantized, there is a possibility for the IDCT output to either underflow or overflow the range allowed by the input sample precision. To further complicate the testing process, a poorly designed test bitstream may actually create an "artificial" overflow condition by selecting a DCT coefficient with a corresponding "run/level" pair that exceeds the output pixel value range.

Therefore, a need exists in the art for a method and apparatus for testing MPEG-like decoders without prior knowledge of the particular circuit implementation of any particular decoder. Specifically, a need exists for a method and apparatus for creating a test sequence or bitstream that will exercise the decoding of the signed level fixed length code by a "black box" MPEG-like video decoder.

SUMMARY OF THE INVENTION

The present invention is a method and apparatus for creating and using an encoded bitstream to evaluate a video decoder. The bitstream contains a plurality of variable length code and/or escape sequences (combination of escape code, run length code and level code) for testing the video decoder's ability to decode syntax elements for DCT coefficients. The bitstream provides a set of fast and effective tests for evaluating black box video decoders which may have no accessible internal nodes.

Specifically, the method of fabricating the test bitstream requires the selection of the proper DCT coefficients, run and quantizer product to produce a valid test bitstream for exercising all possible levels without causing an overflow condition, i.e., causing the video decoder to produce IDCT output values that are outside of a defined range. The test bitstream is constructed such that it exercises all levels while ensuring that all of the 64 IDCT output values are in the range [−384, 383]. The method selects a test level and a desired DCT coefficient and then computes for an appropriate quantizer product. In turn, the quantizer product is used to compute a quantizer scale and a run. This method is repeated for all desired test levels and the resulting level/run pairs and quantizer scales are encoded into the test bitstream.

The method of evaluating a video decoder sends the test bitstream to the decoder while observing the decoder's output. If the decoder fails to decode the test bitstream correctly, the decoder may produce IDCT output values which are outside of the range [−384, 383], thereby creating an overflow condition. Alternatively, the video decoder may simply produce an output which is visually different from a desired image based on the selected DCT coefficients.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In order to devise any test method for evaluating a video decoder, it is necessary to evaluate the steps of the video decoding process.

Figure 1:
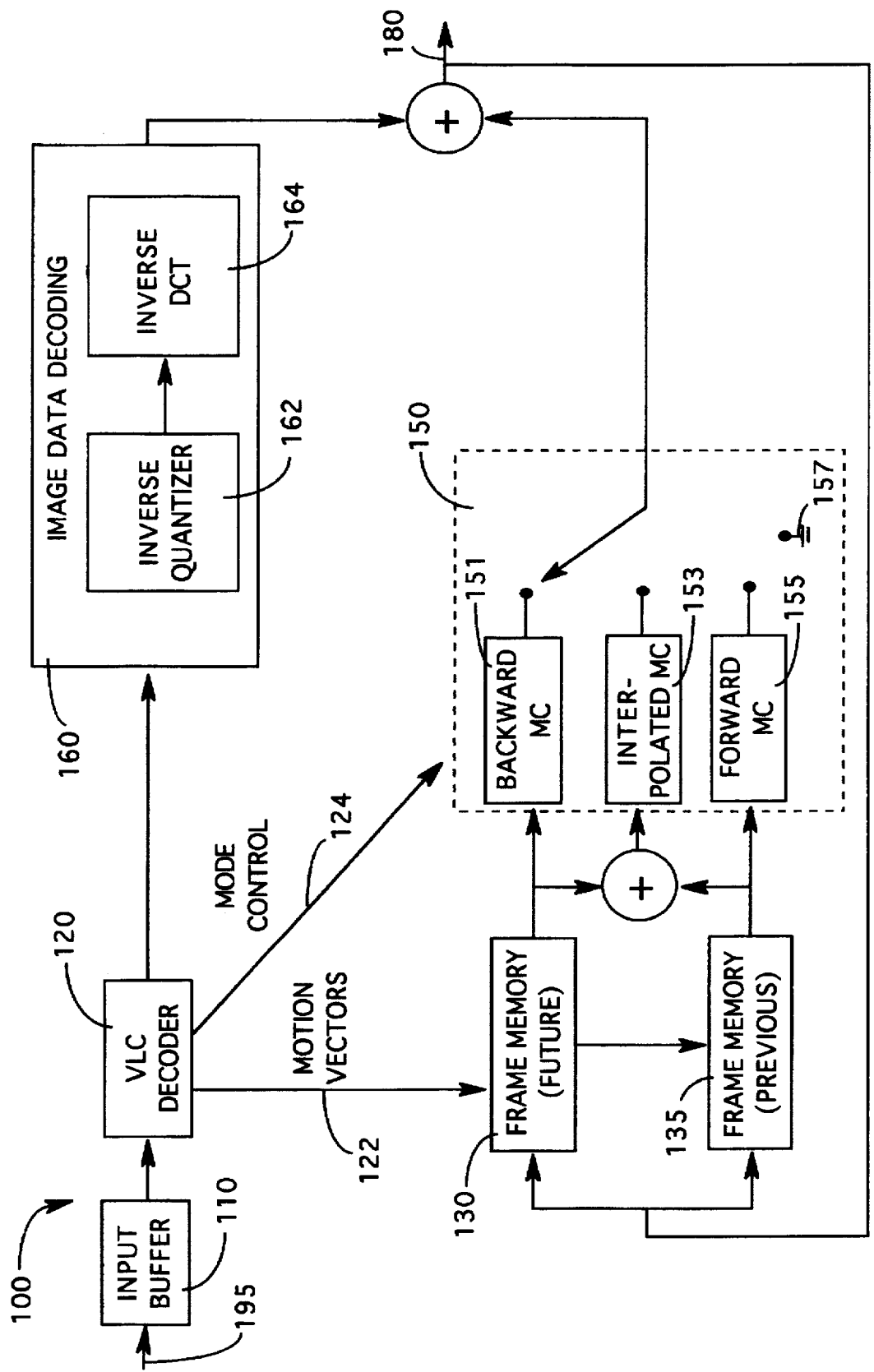
FIG. 1 illustrates a block diagram of the basic structure of a conventional video decoder.

FIG. 1 depicts a block diagram of a simplified structure of a video decoder 100 for receiving an encoded video bitstream 195. The video decoder 100 comprises an input buffer 110, a variable length code (VLC) decoder section 120, an image data decoding section 160, frame memory sections 130 and 135 and a mode control section 150. The video decoder accepts the encoded video bitstream from path 195 and decodes the various data elements which are used to produce a decoded video output 180.

Specifically, the encoded video bitstream is received and accumulated into the input buffer 110 until it is needed. The VLC decoder section 120 decodes the picture type and all other information via a plurality of variable length code tables which are disclosed in ISO/IEC International Standards 11172 and 13818. The mode control information 124 are forwarded to the mode control section 150 which comprises a backward motion compensation (MC) section 151, an interpolated MC section 153, a forward MC section 155 and an intra coding section 157. The proper selection of a particular motion compensation or intra coding section depends upon the picture type of a decoded picture.

For each block of image pixels (e.g., macroblock in MPEG terminology), the VLC decoder section 120 also decodes the motion vectors 122, if any, giving the displacement from the stored previous and/or future pictures. The previous and future reference pictures are stored in the previous frame memory section 135 and future frame memory section 130 respectively. The motion vectors 122 are used in conjunction with the mode control section 150 to produce a predicted block.

The VLC decoder section also decodes the quantized DCT coefficients corresponding to the predictive residual or difference block. The decoded quantized DCT coefficients are forwarded to image data decoding section 160, where dequantization and inverse discrete cosine transform (IDCT) are applied to the quantized DCT coefficients by an inverse quantizer section 162 and an inverse DCT section 164 respectively.

The process of scaling the DCT coefficients and truncating them to integer values is called quantization, while the rescaling to restore approximately the original DCT coefficients magnitude is known as dequantization. The inverse quantizer section 162 dequantizes the quantized DCT coefficients by multiplying it with a set of appropriate quantization values. Since quantization is a lossy process, the reconstructed DCT coefficients may differ in value from the original DCT coefficients.

The resulting dequantized 8×8 block of DCT coefficients is passed to the inverse DCT section 164 where the process of IDCT reconstructs the set of samples from the scaled set of cosine basis functions for each block to produce the decoded predictive residual signal (IDCT output values). This signal is added to the predicted block, if any, to produce the decoded picture 180.

Furthermore, the VLC decoder section 120 also decodes important parameters or syntax elements such as "dct_coeff_first" and "dct_coeff_next" ("First DCT coefficient" and "Subsequent DCT coefficient" for MPEG-2). These syntax elements are defined in ISO/IEC International Standards 13818-2 and 11172-2 rev 1. These syntax elements are generally run-length encoded for providing information about "run/level" pairs (also known as run/amplitude pair). Each run/level pair indicates a number, i.e., a "run", of zero coefficient and the amplitude, i.e., the "level", of a non-zero coefficient. A set of variable length codes for dct_coeff_first and dct_coeff_next is provided in tables in the MPEG standards for frequently encountered run/level pairs. However, many statistically uncommon combinations of run and level are not represented by these variable length codes. In order to encode these uncommon run/level pairs, a 6-bit "Escape" VLC code is generally followed by a 6-bit fixed length code defining the "run", which is followed by a 8-bit or 16-bit (12-bit for MPEG-2) fixed length code defining the "level".

To illustrate, Table 1 and Table 2 provide information necessary to construct a proper escape sequence code for a run/level pair. The run length and level are derived respectively from Table 1 and Table 2.

TABLE 1

| RUN-LENGTH | VLC CODE |
| --- | --- |
| 0 | 0000 00 |
| 1 | 0000 01 |
| 2 | 0000 10 |
| . | . |
| . | . |
| 62 | 1111 10 |
| 63 | 1111 11 |

TABLE 2

| LEVEL | VLC CODE |
| --- | --- |
| −256 | FORBIDDEN |
| −255 | 1000 0000 0000 0001 |
| −254 | 1000 0000 0000 0010 |
| . | . |
| −129 | 1000 0000 0111 1111 |
| −128 | 1000 0000 1000 0000 |
| −127 | 1000 0001 |
| −126 | 1000 0010 |
| . | . |
| −2 | 1111 1110 |
| −1 | 1111 1111 |
| 0 | FORBIDDEN |
| 1 | 0000 0001 |
| 2 | 0000 0010 |
| . | . |
| 126 | 0111 1110 |
| 127 | 0111 1111 |
| 128 | 0000 0000 1000 0000 |
| 129 | 0000 0000 1000 0001 |
| . | . |
| 254 | 0000 0000 1111 1110 |
| 255 | 0000 0000 1111 1111 |

For example, if there is no pre-defined VLC code for a run length of 3 and a level of −5, then a proper escape sequence code is 000001 000011 1111101, where 000001 is the escape code followed by the codes for the run and the level as defined in Table 1 and Table 2. However, those skilled in the art will realize that other tables exist and the levels are not limited to the range [−255, +255].

Thus, the video decoder must decode these syntax elements properly to produce the desired output pixel values. Thus, it is necessary to construct a set of test methods to evaluate the performance of a video decoder's ability to decode and apply these syntax elements.

Figure 2:
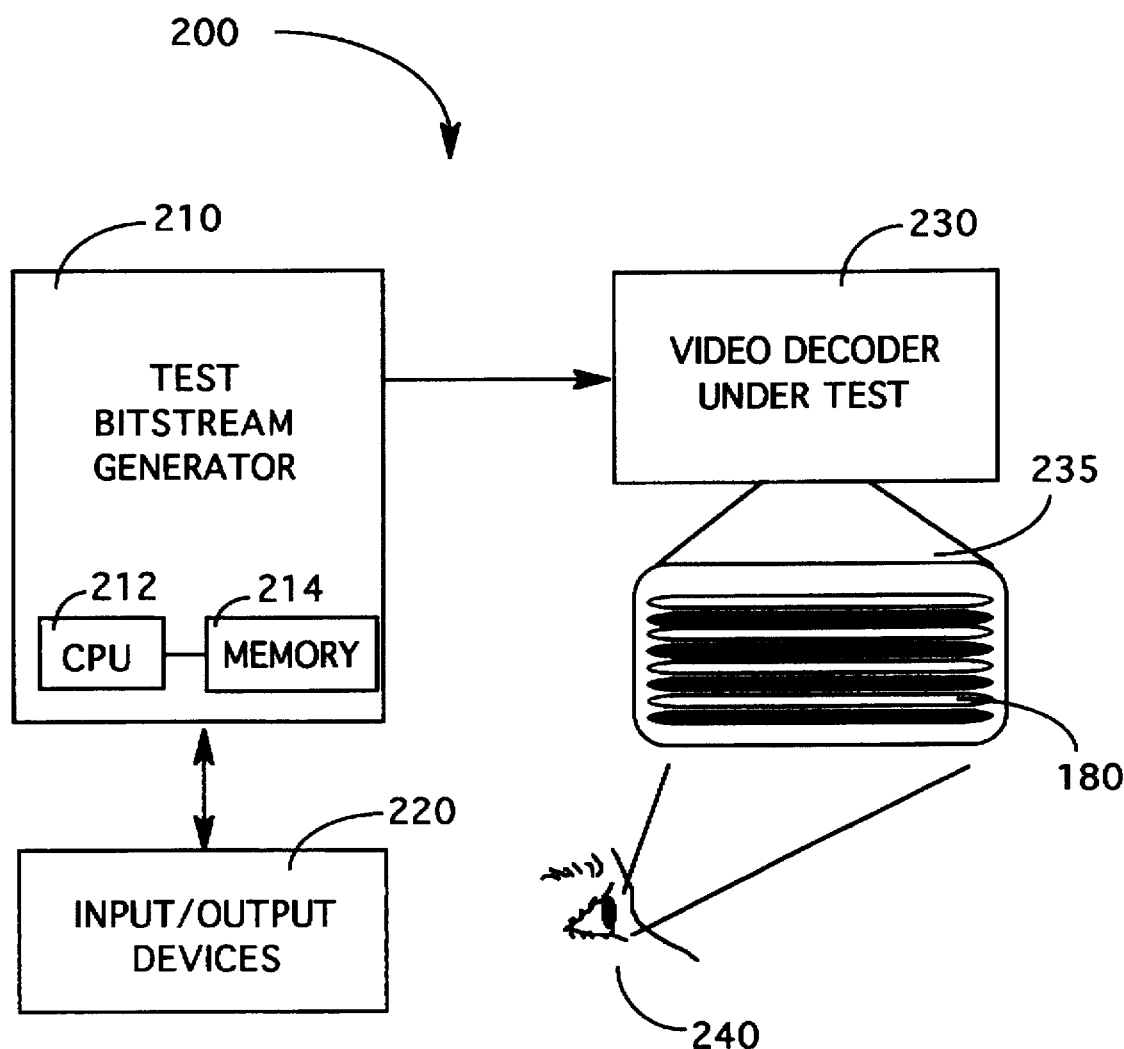
FIG. 2 illustrates a test apparatus of the present invention.

FIG. 2 illustrates a test apparatus 200 of the present invention. The test apparatus comprises a test bitstream generator 210 and an evaluation tool 240. In the preferred embodiment, the test bitstream generator comprises a general purpose computer having a central processing unit (CPU) 212 and a memory 214 for generating a plurality of encoded video bitstreams for evaluating a video decoder under test 230. The encoded video bitstream can be stored in the memory 214 or other storage devices (not shown) such as various disk drives or storage media. The video decoder under test can be a physical video decoder device which is coupled to the test bitstream generator through a communication system such as a transmission channel. Alternatively, the video decoder under test can be represented by an algorithm residing in the memory of the test bitstream generator.

The test bitstream generator 210 is coupled to a plurality of input and output devices 220 such as a keyboard, a mouse, a camera, a camcorder, a video monitor or storage devices including but not limited to a hard disk drive or a compact disk drive. The input devices serve to provide inputs to the test bitstream generator for producing the encoded video bitstreams or to retrieve the encoded video bitstreams from a storage device (not shown).

The operator of the test apparatus sends an encoded video bitstream to video decoder 230 which, in turn, generates a response or video output 180. The video output is displayed on a video monitor 235, which can be a separate display device or one of the output devices used by the test bitstream generator. The video output may comprise a decoded test frame having a plurality of different visual signs or signals such as regions with a uniform shading or different brightness in various patterns.

The visual signs are easily detected and are received by the evaluation tool 240 to gauge the performance of the video decoder under test. In the preferred embodiment, the evaluation tool is simply a viewer. Alternatively, the evaluation tool is directly coupled to the video decoder under test and may include an oscilloscope, various meters, a logic analyzer or equipment capable of discerning relative brightness of regions on the video monitor.

Figure 3:
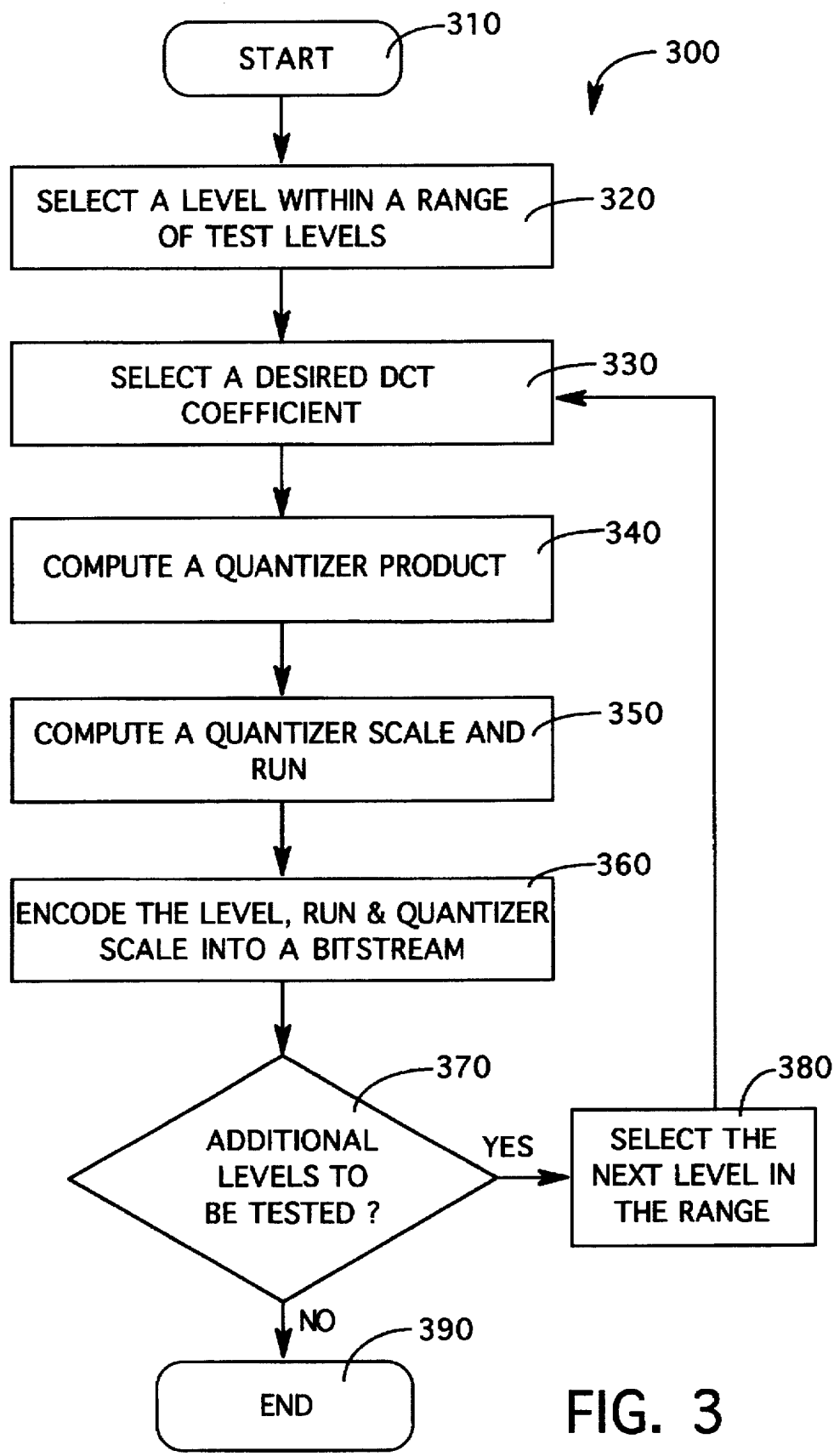
FIG. 3 illustrates a flowchart of a method for selecting the proper DCT coefficients, run and quantizer product.

FIG. 3 illustrates a method 300 for selecting the proper DCT coefficients, run and quantizer product to produce a valid test bitstream for exercising all possible levels without causing an overflow condition. Namely, the test bitstream must be constructed such that it will exercise all levels while ensuring that all of the 64 IDCT output values are in the range [−384, 383]. Currently, MPEG requires all MPEG-compliant decoders to be able to address all IDCT output values within the range [−384, 383]. As such, those skilled in the art will realize that method 300 and equation 1 (discussed below) can be modified to accommodate other ranges.

Referring to FIG. 3, the method 300 begins at step 310 and proceeds to step 320 where method 300 selects a level to be tested. Generally, the input pixel values have a range from 0 to 255 (8-bit precision), thereby providing a dynamic range for the DCT coefficients of about −1024 to +1023. However, the component pixels of P and B pictures represent difference value which may range from −255 to 255. The resulting dynamic range for the DCT coefficients is about −2047 to +2047.

Thus, the level is generally chosen from a range of test levels defined by the dynamic range of the DCT coefficients. For example, a 24-bit fixed length code (6-bit escape code +6-bit run+12 bit level) will permit a maximum test level range of [−2048, +2047 with 0 forbidden]. Alternatively, smaller range of test levels are possible where the DCT coefficients are quantized by larger quantizer scales. Once a test level is selected, method 300 proceeds to step 330.

In step 330, method 300 selects a desired DCT coefficient. Although various DCT coefficients can be selected to produce a valid bitstream, the DCT coefficient should preferably be selected to produce an IDCT output value that is close to the maximum value. This will cause the video decoder to produce a more visible error on the decoded test frame if the decoder misinterprets the dct_coeff_first and dct_coeff_next syntax elements or fails to properly perform the IDCT process. A small DCT coefficient may produce a small error that is not easily detectable in the decoded test frame. A DCT coefficient within the range of 100 to 1595 should be sufficient to produce a noticeable error. In the preferred embodiment, the DCT coefficient of 800 is initially selected.

The proper selection of a DCT coefficient is essential in producing a proper test bitstream that is capable of exercising all possible levels without causing an overflow condition. A maximum value of a desired DCT coefficient is calculated in accordance with:

$$DCT\ coefficient_{max} = \frac{\max(abs(IDCT\ output\ value))}{\max_{j,k=0,\ldots,7}(abs(IDCT(H_{jk}[u][v])))} \quad (1)$$

where u, v are coordinates in the transform domain and $H_{jk}[u][v]$ is an 8 by 8 matrix where the only non-zero entry is $H_{jk}[j][k]=1$.

Since the $$\max_{j,k=0,\ldots,7}(abs(IDCT(H_{jk}[u][v]))) \cong 0.24$$

and the max(abs(IDCT output value)) is currently defined at 383 for a video decoder, then a maximum value for a desired DCT coefficient is approximately 1595. Therefore, if a single non-zero DCT coefficient (at any run) is in the range [−1595, +1595], then the pixels will be in the range [−384, +383]. By selecting the maximum magnitude in the pixel domain to be about 192, the initial DCT coefficient is (192/.024)=800 (positive or negative, depending on the signed level under test). However, those skilled in the art will realize that the max(abs(IDCT output value)) can be changed to produce a different maximum desired DCT coefficient and although the maximum magnitude in the pixel domain is selected at 192, the present invention is not limited to such value.

In step 340, method 300 computes a quantizer product or step. The quantizer product is derived from the product of a quantization matrix and a quantizer scale. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. Since a different quantization value can be applied to each DCT coefficient, a "quantization matrix" in the video decoder is generally established as a default reference table, e.g., a luminance quantization table. However, a customized quantization matrix is also permitted and is generally encoded into the sequence header of a bitstream. Thus, the encoder chooses a quantization matrix that determines how each frequency (DCT) coefficient in the transformed block is quantized.

Furthermore, a quantizer scale is also applied to the DCT coefficients for the purpose of controlling the number of coded bits generated by the encoder. For example, the encoder may increase the value of the quantizer scale to reduce the number of DCT coefficients, thereby reducing the number of encoded bits. In step 340, the quantizer product for MPEG-2 is calculated as follows:

$$F''[v][u]=(((QF[v][u]*2)+Sign(QF[v][u]))*W[w][v][u]*quantizer\_scale/32 \quad (2)$$

where u, v are coordinates in the transform domain, $F''[v][u]$ is a two-dimensional DCT coefficient, $QF[v][u]$ is the level, Sign is the positive or negative sign of the level and $W[w][v][u]$ is the quantization matrix.

In step 350, the method calculates the quantizer scale and the run for the selected level. To simplify the testing, method 300 only exercises one run/level pair at a time. Namely, each 8×8 DCT block contains only one non-zero DCT coefficient positioned at a particular run. As such, the run is generally pre-defined and method 300 simply calculates the quantizer scale by dividing the quantizer product with the corresponding quantizer value from the quantization matrix. Alternatively, a quantizer scale can be pre-defined and the quantizer product is used to derive a run. In order to further simplify the calculations, the quantization matrix is defined as:

$$quant\_matrix(run)=run+1 \quad (3)$$

where "run" is the coordinate in accordance with the zigzag order of run length coding. Thus, a quantizer value of 11 will be applied to a run of 10 and so forth. In this manner, a quantizer scale is determined from the quantizer product with appropriate rounding to form integer values. However, the quantizer scale is limited to a pre-defined range of 1-31 for MPEG-1 and 2-62 for MPEG-2. If the calculation requires a quantizer scale beyond the defined range, then a different run or a different DCT coefficient is selected to accommodate an acceptable quantizer scale. Since method 300 exercises all levels and not all possible run/level pairs, the runs can be adjusted to compute for an acceptable quantizer scale. Similarly, the selected DCT coefficient is chosen from a desired range of DCT coefficients that should produce detectable errors at the output image and, as such, other DCT coefficients within the desired range are acceptable.

In step 360, the encoder encodes the resulting level, run, quantizer scale and quantization matrix to form the test bitstream.

In step 370, method 300 determines whether additional levels remain to be tested. If the decision is negatively answered, method 300 ends in step 390. If the decision is affirmatively answered, method 300 proceeds to step 380 where the next level in the test level range is selected. Method 300 proceeds to step 330 and the steps 330 through 360 are repeated until all levels are encoded to form the test bitstream.

Alternatively, a test method may exercise multiple run/level pairs at a time. Namely, each 8×8 DCT block contains more than one non-zero DCT coefficient with different runs. Multiple non-zero DCT coefficients in a DCT block increase the complexity of computing the proper DCT coefficients, run and quantizer product to produce a valid test bitstream for exercising all possible levels without causing an overflow condition.

One simple approach is to apply the Parseval Theorem which states that the sum of squares in the time domain equals the sum of squares in the frequency domain. Thus, if there is only one non-zero coefficient per DCT block, then by Parseval Theorem, if that DCT coefficient is in the range [−384, 383] then all the values in the IDCT output value will also be in the range [−384, 383]. Thus, for multiple non-zero DCT coefficients in a DCT block, the DCT coefficients must be selected such that the sum of squares of the DCT coefficients must be less than or equal to $383^2$. If any DCT coefficient is outside the range [−384, 383], then the square of DCT coefficient by itself would be larger than the sum of the squares of the DCT coefficients. Namely, if the sum of the absolute values of the DCT coefficients is less than 383, then the sum of their squares is less than $383^2$.

There has thus been shown and described a novel method and apparatus for selecting the proper DCT coefficients, run and quantizer product to produce a valid test bitstream for exercising all possible levels without causing an overflow condition. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A method of evaluating a video decoder, comprising the steps of:

(a) sending a bitstream to the video decoder, where said bitstream comprises a plurality of run/level pairs, where each run/level pair having a run and a level, and quantizer scales selected to exercise a plurality of test levels to cause the video decoder to produce output values which are within an inverse discrete cosine transform (IDCT) output range of the video decoder, where said runs and quantizer scales are computed from a quantizer product;

(b) decoding said bitstream using the video decoder; and (c) observing a response from the video decoder corresponding to said bitstream to evaluate the video decoder's decoding of said plurality of run/level pairs and quantizer scales, where said response is an output from the video decoder in decoding said bitstream.

2. The method of claim 1, wherein said quantizer product is computed in accordance with:

$$F''[v][u]=(((QF[v][u]*2)+Sign(QF[v][u]))*W[w][v][u]*quantizer\_scale/32;$$

where u, v are coordinates in a transform domain, $F''[v][u]$ is a desired DCT coefficient, $QF[v][u]$ is said test level, Sign is a positive or negative sign of said test level and $W[w][v][u]$ is a quantization matrix.

3. The method of claim 2, wherein said quantization matrix is defined as:

$$quant\_matrix(run)=run+1;$$

where "run" is a coordinate in accordance with a zigzag order of run length coding.

4. The method of claim 2, wherein a maximum value of said desired DCT coefficient is calculated in accordance with:

$$DCT\ coefficient_{max} = \frac{\max(\text{abs}(IDCT\ \text{output value}))}{\max_{j,k=0,\ldots,7}(\text{abs}(IDCT(H_{jk}[u][v])))}$$

where u, v are coordinates in the transform domain and $H_{jk}[u][v]$ is an 8 by 8 matrix where an only non-zero entry is $H_{jk}[j][k]=1$.

5. The method of forming a bitstream for evaluating a video decoder comprising the steps of:

(a) selecting a test level to be tested;

(b) selecting a desired discrete cosine transform (DCT) coefficient;

(c) computing a quantizer product;

(d) computing a quantizer scale and run from said quantizer product; and (e) encoding said test level, run and quantizer scale into the bitstream.

6. The method of claim 5, further comprising the step of:

(f) repeating steps (a) through (e) for all test levels within a test range.

7. The method of claim 5, wherein said desired DCT coefficient is selected to produce an inverse discrete cosine transform (IDCT) output value that is within a range [−384, +383].

8. The method of claim 5, wherein a maximum value of said desired DCT coefficient is calculated in accordance with:

$$DCT\ coefficient_{max} = \frac{\max(\text{abs}(IDCT\ \text{output value}))}{\max_{j,k=0,\ldots,7}(\text{abs}(IDCT(H_{jk}[u][v])))}$$

where u, v are coordinates in a transform domain and $H_{jk}[u][v]$ is an 8 by 8 matrix where an only non-zero entry is $H_{jk}[j][k]=1$.

9. The method of claim 8, where said $$\max_{j,k=0,\ldots,7}(\text{abs}(IDCT(H_{jk}[u][v])))$$

approximately equal to 0.24 and said max(abs(IDCT output value)) is equal to 383.

10. The method of claim 5, wherein a plurality of said desired DCT coefficients are selected for a single DCT block, where a maximum value of each of said desired DCT coefficients is calculated, where a sum of squares of said desired DCT coefficients must be less than or equal to the square of the max(abs(IDCT output value)).

11. The method of claim 5, wherein said quantizer product is selected in accordance with:

$$F''[v][u] = (((QF[v][u]*2) + Sign(QF[v][u]))*W[w][v][u]*quantizer\_scale/32;$$

where u, v are coordinates in a transform domain, $F''[v][u]$ is said desired DCT coefficient, $QF[v][u]$ is said test level, Sign is a positive or negative sign of said test level and $W[w][v][u]$ is a quantization matrix.

12. The method of claim 11, wherein said quantization matrix is defined as:

$$quant\_matrix(run) = run+1;$$

where "run" is a coordinate in accordance with a zigzag order of run length coding.

13. A bitstream for testing a video decoder comprising:

an encoded run/level pair and a quantizer scale selected to exercise a test level to cause the video decoder to produce an output value which is within an inverse discrete cosine transform (IDCT) output range of the video decoder, where said encoded run/level pair and quantizer scale are selected by selecting a desired discrete cosine transform (DCT) coefficient and computing a quantizer product.

14. The bitstream of claim 13, wherein said quantizer product is selected in accordance with:

$$F''[v][u] = (((QF[v][u]*2) + Sign(QF[v][u]))*W[w][v][u]*quantizer\_scale/32;$$

where u, v are coordinates in a transform domain, $F''[v][u]$ is said desired DCT coefficient, $QF[v][u]$ is said test level, Sign is the positive or negative sign of said test level and $W[w][v][u]$ is a quantization matrix.

15. The bitstream of claim 14, wherein said quantization matrix is defined as:

$$quant\_matrix(run) = run+1;$$

where "run" is a coordinate in accordance with a zigzag order of run length coding.

16. The bitstream of claim 13, wherein a maximum value of said desired DCT coefficient is calculated in accordance with:

$$DCT\ coefficient_{max} = \frac{\max(\text{abs}(IDCT\ \text{output value}))}{\max_{j,k=0,\ldots,7}(\text{abs}(IDCT(H_{jk}[u][v])))}$$

where u, v are coordinates in the transform domain and $H_{jk}[u][v]$ is an 8 by 8 matrix where an only non-zero entry is $H_{jk}[j][k]=1$.

17. The bitstream of claim 13, wherein a plurality of said desired DCT coefficients are selected for a single DCT block, where a maximum value of each of said desired DCT coefficients is calculated where a sum of squares of said desired DCT coefficients must be less than or equal to the square of the max(abs(IDCT output value)).

18. An apparatus for testing a video decoder comprising:

means for generating a bitstream, where said bitstream comprises an encoded run/level pair and a quantizer scale selected to exercise a test level to cause the video decoder to produce output values which are within an inverse discrete cosine transform (IDCT) output range of the video decoder, where said encoded run/level pair and quantizer scale are selected by selecting a desired discrete cosine transform (DCT) coefficient and computing a quantizer product;

means, coupled to said generating means, for sending said bitstream to the video decoder; and means, coupled to the video decoder, for observing a response for the video decoder corresponding to said bitstream to evaluate the video decoder, where said response is an output from the video decoder in decoding said bitstream.

19. The apparatus of claim 18, wherein said generating means comprises a general purpose computer having a memory for storing said bitstream.

20. The apparatus of claim 18, wherein said quantizer product is selected in accordance with:

$$F''[v][u] = (((QF[v][u]*2) + Sign(QF[v][u]))*W[w][v][u]*quantizer\_scale/32;$$

where u, v are coordinates in the transform domain, $F''[v][u]$ is said desired DCT coefficient, $QF[v][u]$ is said test level, Sign is the positive or negative sign of said test level and $W[w][v][u]$ is a quantization matrix.

* * * * *